(12) United States Patent
Hui

(10) Patent No.: US 6,427,833 B1
(45) Date of Patent: Aug. 6, 2002

(54) DATA DISC STORAGE CASE

(75) Inventor: Yi Ming Hui, Tai Tam (HK)

(73) Assignee: Dragon Plan Limited, Chai Wan (HK)

( * ) Notice: Subject to any disclaimer, the term of this patent is extended or adjusted under 35 U.S.C. 154(b) by 0 days.

(21) Appl. No.: 09/671,655

(22) Filed: Sep. 28, 2000

(51) Int. Cl.[7] ............................................... B65D 85/57
(52) U.S. Cl. .................................. 206/310; 206/308.1
(58) Field of Search ............................ 206/307, 308.1, 206/309, 310, 493

(56) References Cited

U.S. PATENT DOCUMENTS

| | | | |
|---|---|---|---|
| 5,251,750 A | * 10/1993 | Gelardi et al. ............... | 206/310 |
| 5,526,926 A | * 6/1996 | Deja ....................... | 206/308.1 |
| 5,533,615 A | 7/1996 | McCamy | |
| 5,944,181 A | * 8/1999 | Lau ........................ | 206/308.1 |
| 6,085,900 A | * 7/2000 | Wong ...................... | 206/308.1 |
| 6,164,446 A | 12/2000 | Law | |
| 6,170,656 B1 | * 1/2001 | Cerda-Vilaplana et al. . | 206/310 |
| 6,196,384 B1 | * 3/2001 | Belden, Jr. ................ | 206/310 |
| 6,206,186 B1 | * 3/2001 | Cerda-Vilaplana et al. ...... | 206/308.1 |

FOREIGN PATENT DOCUMENTS

| | | |
|---|---|---|
| DE | 144596 | 1/1903 |
| EP | 252226 | 10/1992 |
| EP | 671743 | 9/1995 |
| EP | 886278 | 12/1998 |
| FR | 2753297 | 3/1998 |

* cited by examiner

*Primary Examiner*—David T. Fidei
(74) *Attorney, Agent, or Firm*—Leydig, Voit & Mayer

(57) ABSTRACT

A data disc storage case for holding a data disc has a body including a pair of panels inter-connected for pivoting apart and close together, one of the panels incorporating a disc locator. The locator includes a platform for supporting a disc having a recess, and an integral hooking device extending across opposite sides of the recess for engaging the disc through its central hole. The hooking device includes two hook members having respective upper ends as hooks facing outwards to engage hole disc and respective lower ends connected integrally to the opposite sides of the recess and an integral press member connected to and between the hook members, so that upon depression, the hook members pivot slightly inwards about their lower ends, so the hooks retract for disengagement from the disc and release the disc.

20 Claims, 5 Drawing Sheets

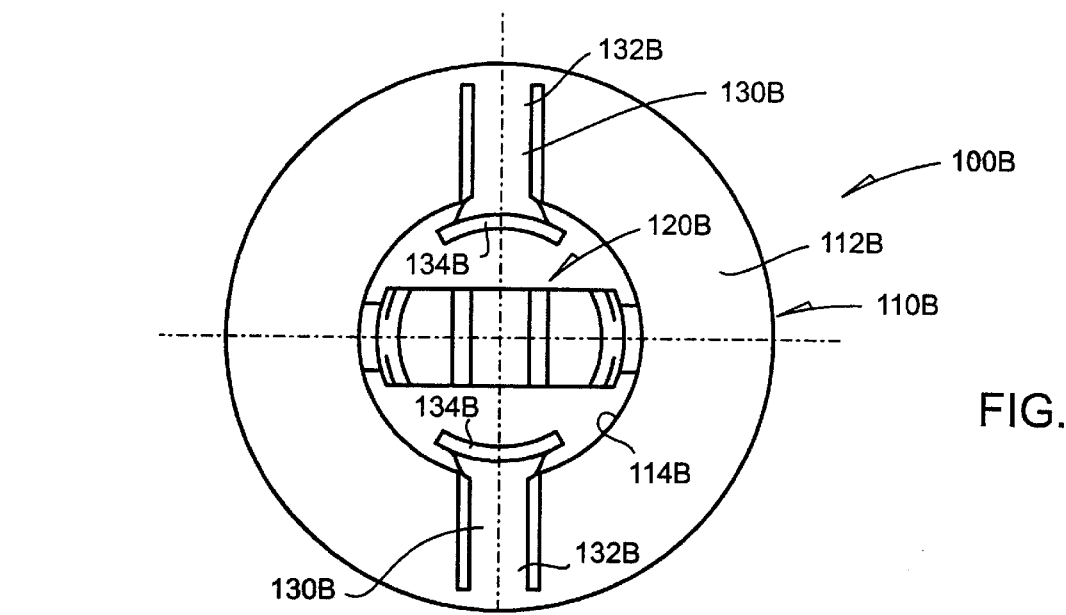
FIG. 3A
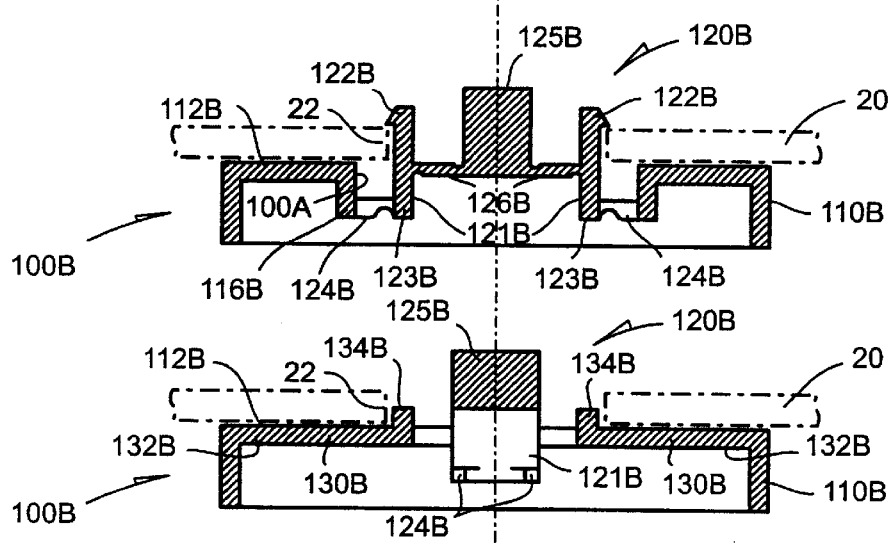
FIG. 3B
FIG. 3C
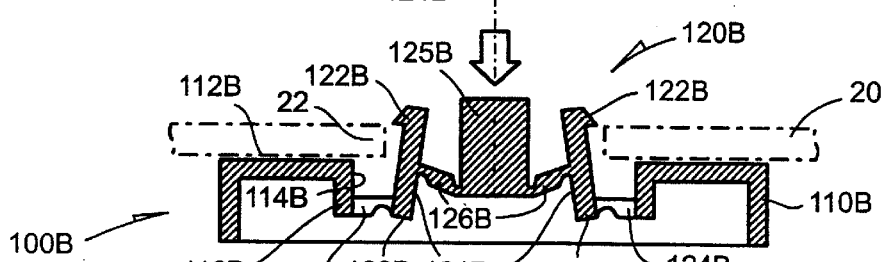
FIG. 3D
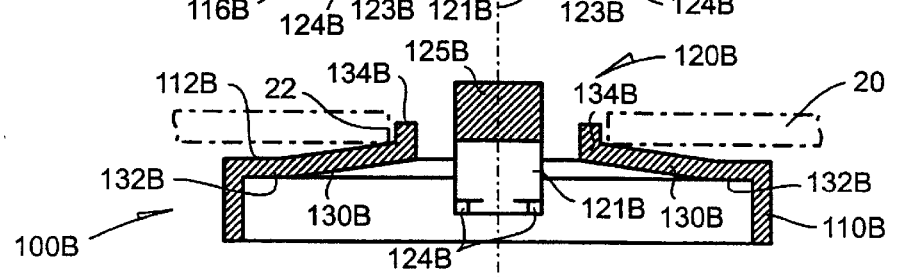
FIG. 3E

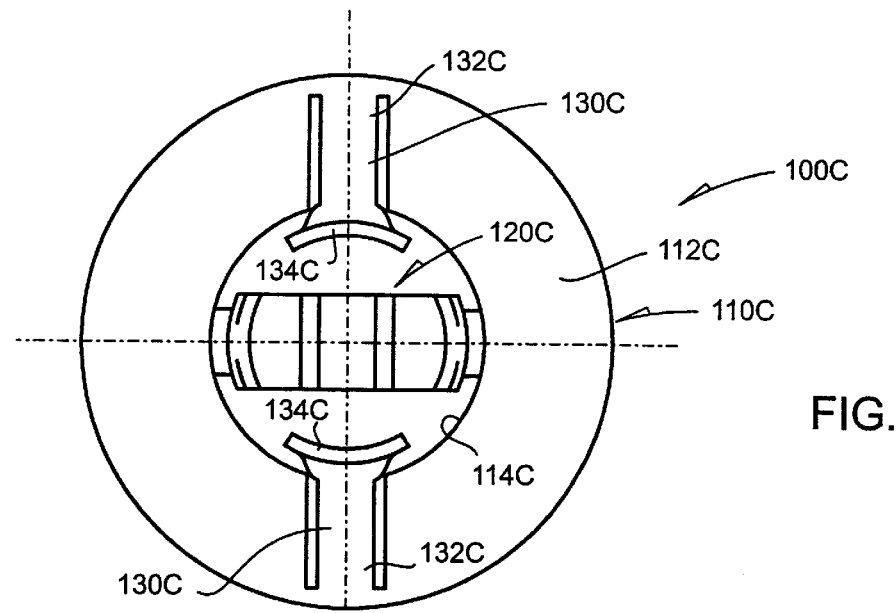
FIG. 4A
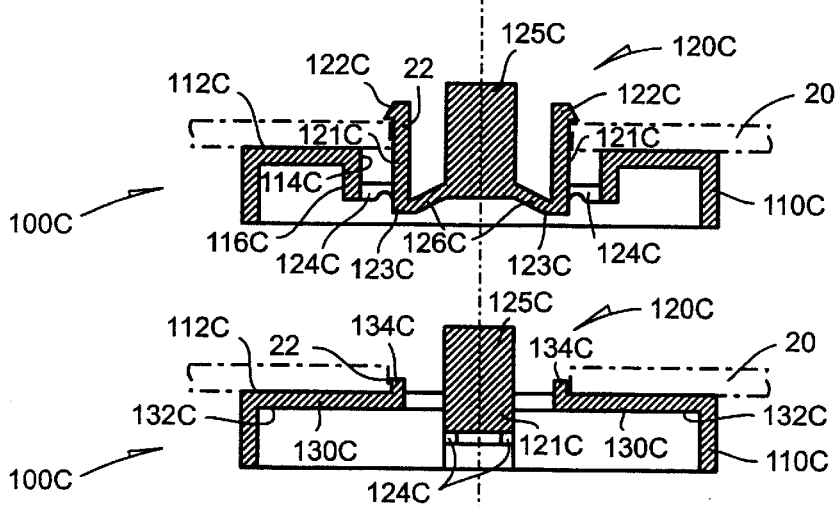
FIG. 4B
FIG. 4C
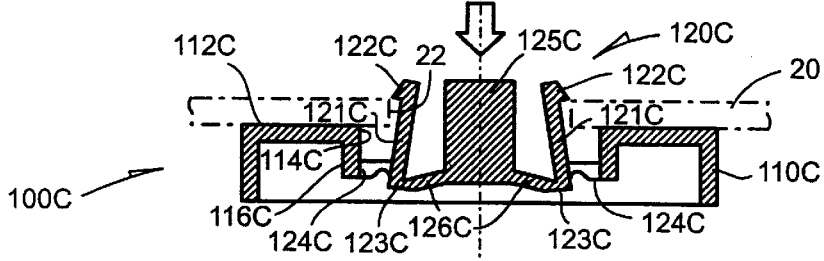
FIG. 4D
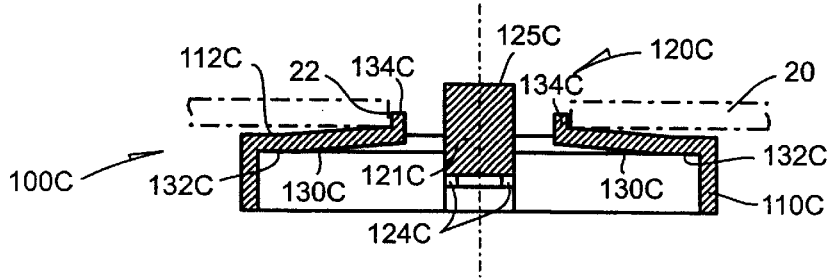
FIG. 4E

DATA DISC STORAGE CASE

The present invention relates to a storage case for holding an audio/visual/computer data disc of all types, such as DVD, VCD, CD and CD-ROM discs.

BACKGROUND OF THE INVENTION

Data discs of such types are in abundant use, which are usually stored in a flat plastics storage case. Most of the existing storage cases include a ring of friction members for engaging the disc by its centre hole, thereby holding the disc by friction. The friction members will contract when being pressed from above, whereby the disc is released. Such a frictional engagement is unreliable by nature. Another disadvantage is that plastics powder will inevitably be ground off from the rim of the disc hole and/or the friction members through repeated rubbing with each other. Such powder often adheres to the disc surface through electrostatic attraction, whereby the reading of data from the disc will be affected.

The invention seeks to mitigate or at least alleviate such problems by providing an improved data disc storage case.

SUMMARY OF THE INVENTION

According to the invention, there is provided a data disc storage case for holding a data disc having a central hole, which storage case has a body formed by a pair of panels inter-connected for pivoting apart and close together, one of said panels incorporating a disc locator which comprises a base for supporting said disc and having a recess and includes an integral hooking device extending across equiangularly opposite sides of the recess for engaging through the hole of said disc, which hooking device is formed by at least two hook members having respective upper ends as hooks facing outwards to engage the hole of said disc and respective lower ends connected integrally to said opposite sides of the recess and by a press member connected integrally between the hook members, such that the press member will upon depression pivot the hook members slightly inwards about their lower ends, whereby the hooks are contracted for disengagement from the hole of said disc for releasing said disc.

Preferably, the hook members extend substantially perpendicular to the base.

It is an advantage that the uppermost part of the press member is elevated beyond the hooks.

It is preferred that the hook members are connected to said opposite sides of the recess by weakened members for bending, and the press member is connected to the hook members also by weakened members for bending.

Preferably, the recess is defined by an aperture having a depending rim, to which rim the hook members are connected.

In a first preferred example, the press member is connected integrally to the upper ends of the hook members on opposite sides.

In a second preferred example, the press member is connected integrally to the middle parts of the hook members on opposite sides.

In a third preferred example, the press member is connected integrally to the lower ends of the hook members on opposite sides.

In a preferred embodiment, the disc locator includes at least two spring levers provided integrally on an upper surface of the base for lifting said disc upon release.

More preferably, each spring lever has a free end bent upwards to form a flange for engagement within the hole of said disc to position said disc centrally with respect to the hooking device.

More preferably, the spring levers are provided in an equiangular manner around the hooking device.

BRIEF DESCRIPTION OF DRAWINGS

The invention will now be more particularly described, by way of example only, with reference to the accompanying drawings, in which:

FIGS. 3A to 3C are a top plan view and two cross-sectional side views of a second example of the disc locator of FIG. 1 holding the disc;

FIGS. 3D and 3E are cross-sectional side views corresponding to FIGS. 3B and 3C, showing how the disc is released;

FIGS. 4A to 4C are a top plan view and two cross-sectional side views of a third example of the disc locator of FIG. 1 holding the disc;

FIGS. 4D and 4E are cross-sectional side views corresponding to FIGS. 4B and 4C, showing how the disc is released.

DETAILED DESCRIPTION OF PREFERRED EMBODIMENT

Figure 1:
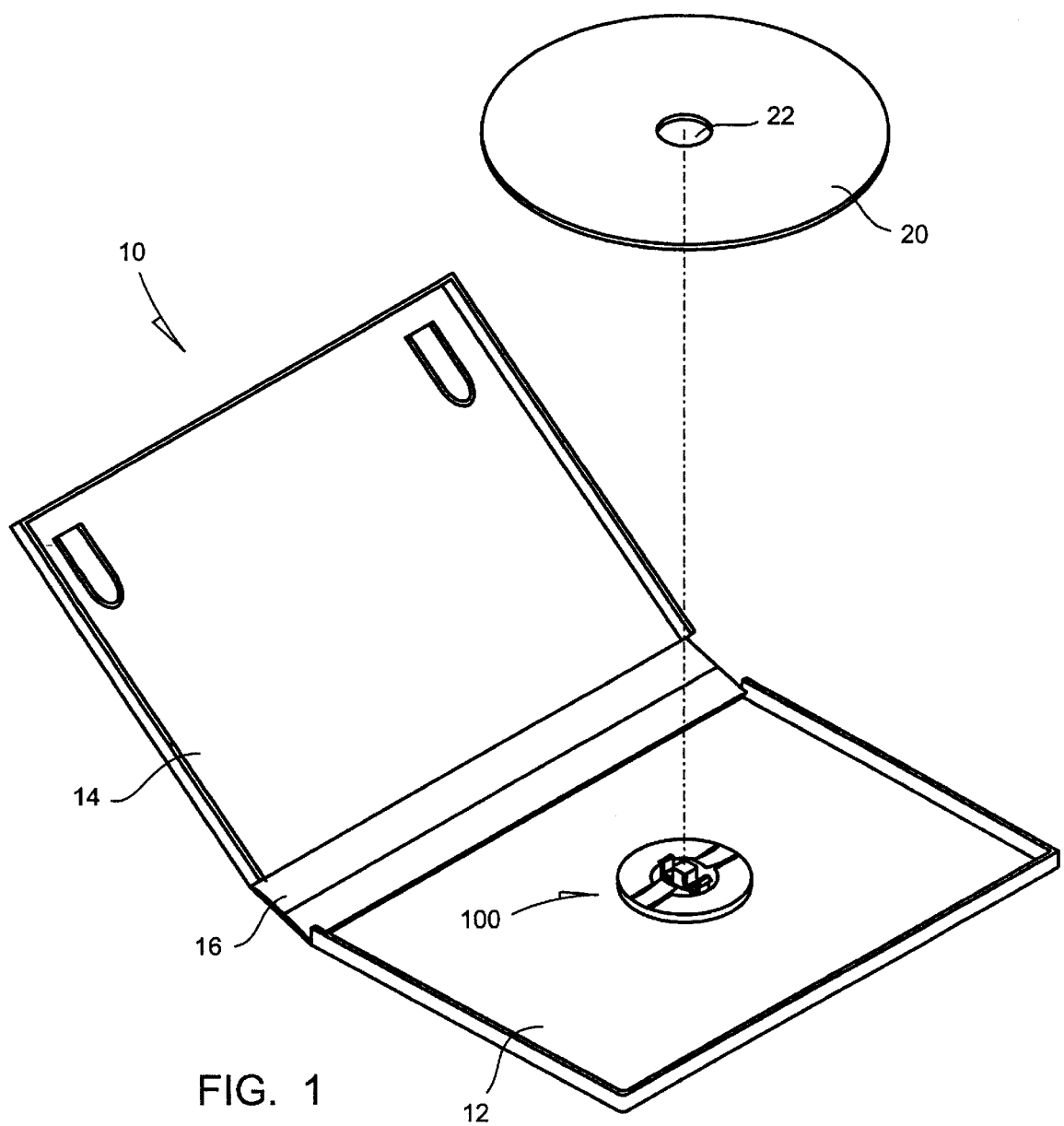
FIG. 1 is a perspective view of an embodiment of a data disc storage case in accordance with the invention, said storage case incorporating a central locator for holding a disc.

Referring initially to FIG. 1 of the drawings, there is shown a data disc storage case 10 embodying the invention for holding a data disc 20 such as a DVD, VCD, CD or CD-ROM disc, which storage case 10 has a plastics body formed by a pair of inter-connected rectangular panels. The first panel is in the form of a base tray 12, and the second panel a lid tray 14 which is integrally connected to the base tray 12 by means of a co-extending spine 16. The spine 16 acts as a hinge between the trays 12 and 14, such that the lid tray 14 is foldable close onto and off from the base tray 12. The base tray 12 incorporates, centrally on the inner side thereof, a plastics locator 100 for holding the data disc 20 by its central hole 22.

Reference is also made to FIGS. 2A to 2E, which show a first example 100A of the disc locator 100. The locator 100A comprises a base in the form of a horizontal annular platform 110A which has an upper surface 112A and a central recess defined by a circular aperture 114A having a depending rim 116A, a central hooking device 120A for engaging through the hole 22 of the data disc 20, and at least two angularly aligned spring levers 130A. The hooking device 120A bridges centrally across the aperture 114A. The spring levers 130A extend inwards to point at each other from opposite sides of the platform surface 112A centrally with respect to the aperture 114A, such that they are provided symmetrically on opposite sides of the hooking device 120A.

The hooking device 120A is formed by a pair of upright hook members 121A and a press member 125A therebetween. Each hook member 121A has an upper end which provides a hook 122A facing outwards and a lower end 123A which is connected integrally to the corresponding side of the platform aperture rim 116A by means of a pair of resiliently deformable or bendable strips 124A. Each hook 122A has an arcuate convex shape when viewed from above, and is chamfered when viewed from either side. The press member 125A is connected on each opposite side integrally to the corresponding hook member 121A, at the back of its hook 122A, by means of a resiliently deformable or bendable web 126A.

Figure 2A:
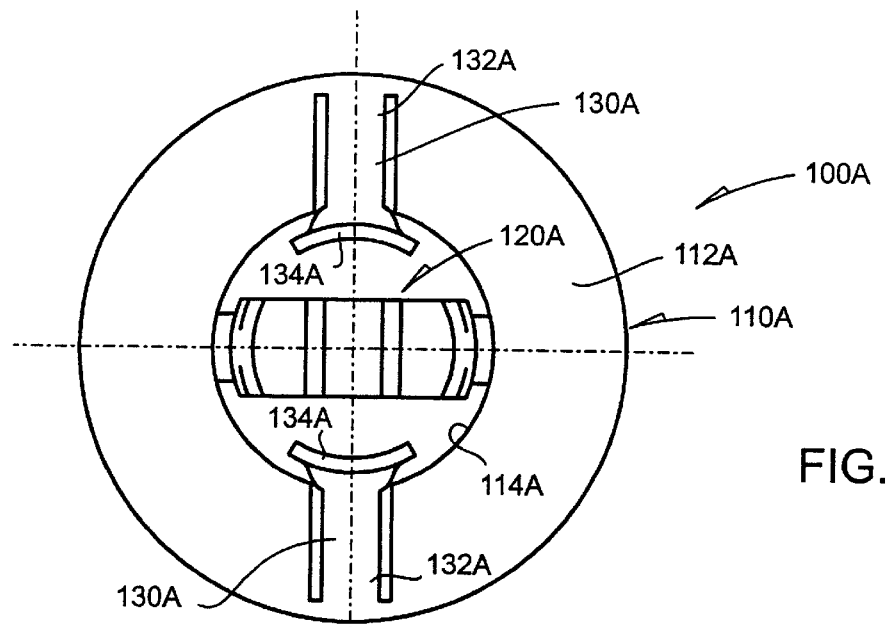
FIGS. 2A to 2C are a top plan view and two cross-sectional side views of a first example of the disc locator of FIG. 1 holding the disc.
Figure 2B:
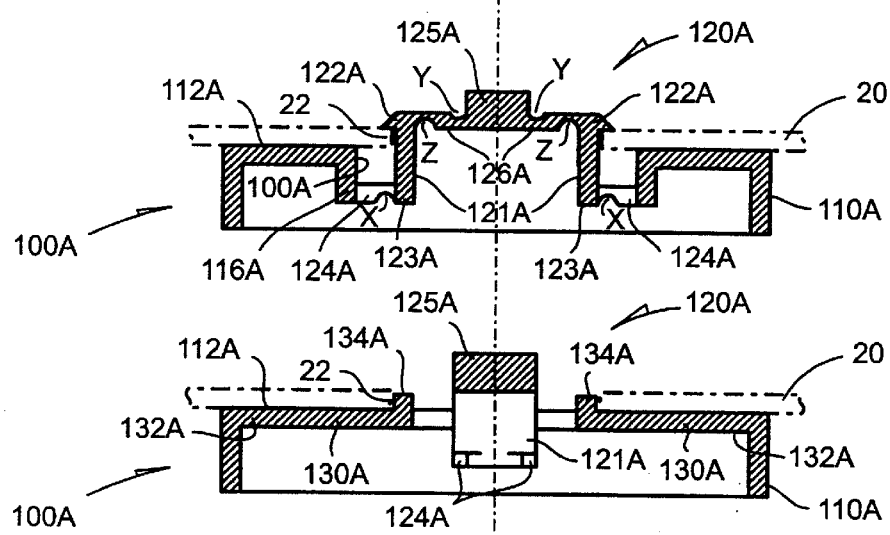
Figure 2C:
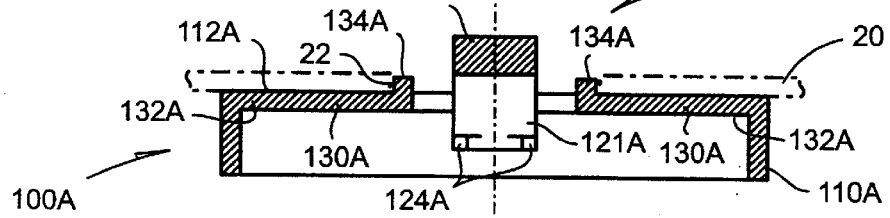

As shown in FIG. 2B, each strip 124A has a cut-out X on its underside to form a weakened part such that the connected hook member 121A is readily pivotable about the cut-out X inwards. Also, each web 126A has a first cut-out Y on its upper side adjacent the press member 125A and a second cut-out Z on its underside adjacent the connected hook member 121A to form respective weakened parts such that the press member 125A is readily movable downwards, pivotable about the cut-outs Y, when the hooking members 121A on opposite sides pivot inwards.

Each lever 130A has a fixed rear end 132A which is integrally formed with the platform surface 112A and a free front end which is bent upwards to form an arcuate concave flange 134A. The levers 130A extend at a small angle upwards and are resiliently deflectable downwards. The two flanges 134A are spaced apart to assume an outer dimension that is slightly smaller than the diameter of the hole 22 of the disc 20.

The hooking device 120A has a normal condition under the action of resilience of its components, in which the two hook members 121A extend vertically upright such that their hooks 122A are spaced apart to assume an outer dimension that is slightly larger than the diameter of the hole 22 of the disc 20. Upon being pressed co-axially down onto the hooking device 120A, the disc 20 will initially compress, by the rim of its hole 22, the hooks 122A to move slightly inwards and then snap past the hooks 122A. As a result, the disc 20 is retained by the hooks 122A and located on the platform 110A (FIG. 2B), with the spring levers 130A being pressed down by the disc 20. Also, the lever flanges 134A engage within the disc hole 22 (FIG. 2C), thereby positioning the disc 20 centrally with respect to the hooking device 120A.

While the disc 20 is being located as described above, the hook members 121A are pivoted momentarily inwards about the strips 124A, with the press member 125A being briefly lowered simultaneously as permitted and facilitated by the webs 126A.

In order to release the disc 20, the press member 125A is pressed momentarily downwards. In this regard, it should be noted that the uppermost end of the press member 125A is elevated beyond the hooks 122A on opposite sides, whereby a person can easily depress the press member 125A, without his finger being nipped by the hooks 122A.

Figure 2D:
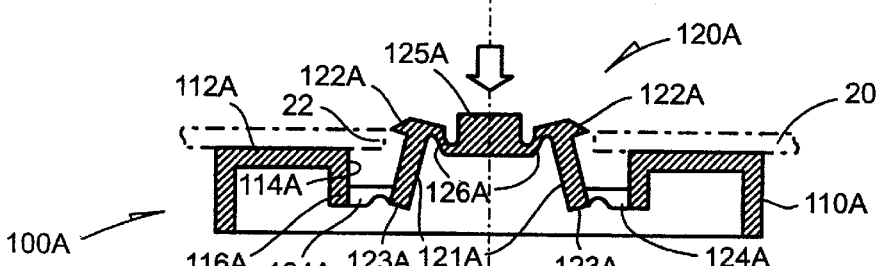
FIGS. 2D and 2E are cross-sectional side views corresponding to FIGS. 2B and 2C, showing how the disc is released.
Figure 2E:
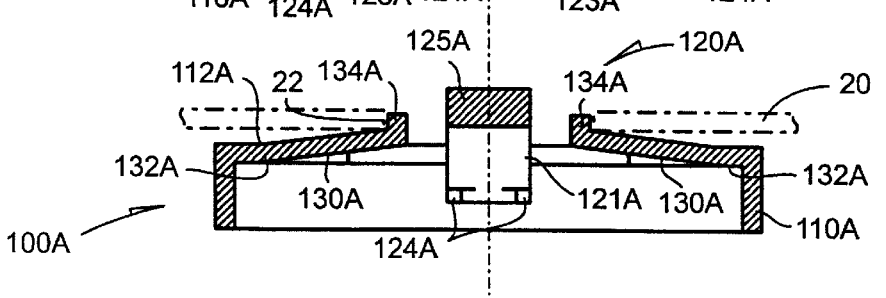

Upon depression, the press member 125A will pivot the hook member 121A slightly inwards, whereby the hooks 122A are contracted and thus disengage from the hole 22 of the disc 20 (FIG. 2D). At the moment when the disc 20 becomes free, the spring levers 130A pivot upwards by virtue of their resilience, thereby lifting up the disc 20 for subsequent removal (FIG. 2E).

As the hooking device 120A is an integral member extending across opposite sides of the platform aperture 114A, with the hook members 121A connected at their upper ends 122A to the press member 125A and their lower ends 123A to the sides of the aperture 114A, the disc locator 100A is not susceptible to damage through use.

Referring now to FIGS. 3A to 3E, which show a second example 100B of the disc locator 100. The second locator 100B has generally the same construction as that of the first locator 100A, with equivalent parts designated by the same reference numerals suffixed by a letter "B" instead of "A". The only major difference lies in the press member 125B being connected to the middle parts of the hook members 121B, rather than their upper ends 122B. In order to suit this arrangement, the press member 125B is made sufficiently thicker or taller in order to extend upwards beyond the hooks 122B, whereby depression is facilitated and the problem of finger nipping can be avoided, which is otherwise more likely than in the case of the first locator 100A.

Figures 5A, 5B, 5C:
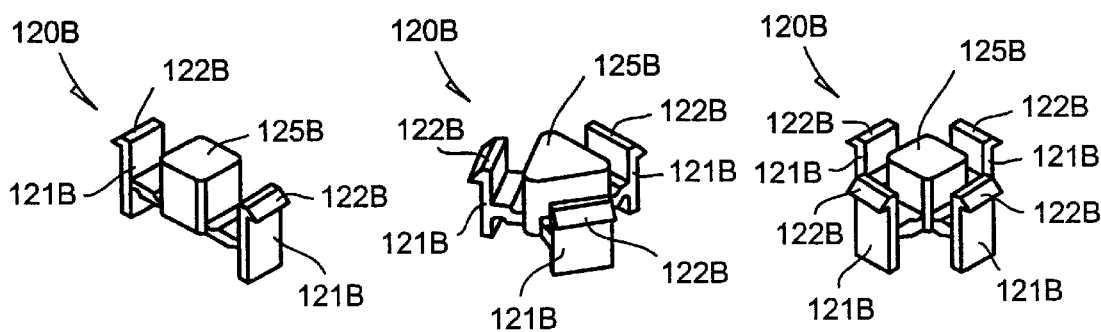
FIG. 5A to 5C are perspective views of three variations of a hooking device of the disc locator of FIG. 1.

Reference is briefly made to FIG. 5A to 5C, of which FIG. 5A shows the hooking device 120B. It is envisaged the hooking device 120B may incorporate more than two hook members 121B or hooks 122B, for example three as shown in FIG. 5B or four in FIG. 5C. In either case, the hook members 121B are positioned in an equiangular manner around the central press member 125B such that the hooking device 120B extends across equiangularly opposite sides of the central aperture 114B.

Referring finally to FIGS. 4A to 4E, which show a third example 100C of the disc locator 100. The third locator 100C has generally the same construction as that of the first locator 100A (or the second locator 100B), with equivalent parts designated by the same reference numerals suffixed by a letter "C" instead of "A" (or "B"). The only major difference lies in the press member 125C being connected to the lower ends 123C of the hook members 121C, rather than their upper ends 122C.

The operation of the second/third disc locator 100B/100C is the same as described above and illustrated in relation to the first locator 100A, which will not be repeated herein for clarity. Compared with the first locator 100A, which provides the best resilient support for the hook 122A, the third locator 100C requires the press member 125C to move the shortest distance, thereby resulting in the quickest response for the hooks 122C. The second locator 100B is a compromise between these two parameters.

The invention has been given by way of example only, and various other modifications of and/or alterations to the described embodiments may be made by persons skilled in the art without departing from the scope of the invention as specified in the appended claims.

What is claimed is:

1. A data disc storage case for holding a data disc having a central hole, the storage case comprising:

a body having a pair of panels inter-connected for pivoting apart and close together, one of the panels incorporating a disc locator, the disc locator including a base for supporting a disc having a central hole, the base having a recess, an integral hooking device extending across equiangularly opposite sides of the recess for engaging the disc at the central hole, the hooking device including at least two hook members having respective upper ends as hooks, facing outwards, for engaging the disc at the central hole of the disc, and respective lower ends connected integrally at opposite sides of the recess, a press member connected to and located between the hook members, so that the press member, upon depression toward the base, pivots the hook members inwards about their lower ends, whereby the hooks are retracted for disengagement from the disc at the central hole, releasing the disc, and at least two integral spring levers located on an upper surface of the base for lifting the disc upon release of the disc from the hook members, each spring lever having a free end bent upwards to form a flange for engagement of the disc at the central hole to position the disc centrally with respect to the hooking device.

2. The data disc storage case as claimed in claim 1, wherein the hook members extend substantially perpendicular to the base.

3. The data disc storage case as claimed in claim 1, wherein the press member is elevated beyond the hooks relative to the base.

4. The data disc storage case as claimed in claim 1, wherein the hook members are connected to the opposite sides of the recess by first weakened members for bending, and the press member is connected to the hook members by second weakened members for bending.

5. The data disc storage case as claimed in claim 1, wherein the recess is defined by an aperture having a depending rim to which the hook members are connected.

6. The data disc storage case as claimed in claim 1, wherein the press member is connected integrally to the upper ends of the hook members.

7. The data disc storage case as claimed in claim 1, wherein the hook members have respective middle parts, intermediate the upper and lower ends of the hook members, and the press member is connected integrally to the middle parts of the hook members.

8. The data disc storage case as claimed in claim 1, wherein the press member is connected integrally to the lower ends of the hook members.

9. The data disc storage case as claimed in claim 1, wherein the spring levers are located equiangularly around the hooking device.

10. A data disc storage case for holding a data disc having a central hole, the data disc storage case comprising:

a body having first and second panels inter-connected for pivoting relative to each, the first panel incorporating a one-piece resilient disc locator for releasably engaging a disc having a central hole, the disc locator including an annular surface for supporting a disc, the annular surface have a central opening with a central axis, a pair of rims extending at separate locations from the annular surface toward the first panel, yielding members extending from and transverse to each of the rims, extending toward the central axis, and having portions with different thicknesses for hinged bending of the yielding members, hook members extending from each of the yielding members, transverse to the first panel, each hook member including a first end most remote from the first panel and having a hook for engaging the disc and a second end proximate the first panel, the corresponding yielding member being connected to the hook member proximate the second end of the hook member, a central press member having a first end extending farther from the first panel than the hooks of the hook members, and having a second end proximate the first panel, and flexible webs respectively connecting the second ends of the hook members to the second end of the press member, whereby the hooks engage the disc at the central hole when no pressure is applied to the press member and the hooks retract when the press member is displaced toward the first panel and disengage from the disc at the central hole, releasing the disc.

11. The data disc storage case as claimed in claim 10, wherein the hook members extend substantially perpendicular to the first panel.

12. The data disc storage case as claimed in claim 10, wherein the annular surface includes two integral spring levers for lifting the disc upon release of the disc from the hook members.

13. The data disc storage case as claimed in claim 14, wherein each spring lever has a free end bent upwards to form a flange for engagement of the disc at the central hole to position the disc.

14. A data disc storage case for holding a data disc having a central hole, the data disc storage case comprising:

a body having first and second panels inter-connected for pivoting relative to each, the first panel incorporating a one-piece resilient disc locator for releasably engaging a disc having a central hole, the disc locator including an annular surface for supporting a disc, the annular surface have a central opening with a central axis, a pair of rims extending at separate locations from the annular surface toward the first panel, respective yielding members extending from and transverse to each of the rims, extending toward the central axis, and having portions with different thicknesses for hinged bending of the yielding members, hook members extending from each of the respective yielding members, transverse to the first panel, each hook member including a first end most remote from the first panel and having a hook for engaging the disc and a second end proximate the first panel, the corresponding yielding member being connected to the hook member proximate the second end of the hook member, a central press member having a first end extending farther from the first panel than the hooks of the hook members, and a second end proximate the first panel, and flexible webs respectively connecting the hook members, intermediate the first and second ends, to the second end of the press member, whereby the hooks engage the disc at the central hole when no pressure is applied to the press member and the hooks retract when the press member is displaced toward the first panel and disengage from the disc at the central hole, releasing the disc.

15. The data disc storage case as claimed in claim 14, wherein the hook members extend substantially perpendicular to the first panel.

16. The data disc storage case as claimed in claim 14, wherein the annular surface includes integral spring levers for lifting the disc upon release of the disc from the hook members.

17. The data disc storage case as claimed in claim 16, wherein each spring lever has a free end bent upwards to form a flange for engagement of the disc at the central hole to position the disc.

18. A data disc storage case for holding a data disc having a central hole, the data disc storage case comprising:

a body having first and second panels inter-connected for pivoting relative to each, the first panel incorporating a one-piece resilient disc locator for releasably engaging a disc having a central hole, the disc locator including an annular surface for supporting a disc, the annular surface have a central opening with a central axis, a pair of rims extending at separate locations from the annular surface toward the first panel, respective first yielding members extending from and transverse to each of the rims, extending toward the central axis, and having portions with different thicknesses for hinged bending of the first yielding members, hook members extending from each of the first yielding members, transverse to the first panel, each hook member including a first end most remote from the first panel and having a hook for engaging the disc and a second end proximate the first panel, the corresponding first yielding member being connected to the hook member proximate the second end of the hook member, a central press member having a first end extending farther from the first panel than the hooks of the hook members, and a second end proximate the first panel, and second yielding members extending generally transverse to corresponding hook members and connecting the first ends of the hook members to the second end of the press member, the second yielding members including thicker and thinner wall portions for hinged bending in response to movement of the press member toward the first panel, whereby the hooks engage the disc at the central hole when no pressure is applied to the press member and the hooks retract when the press member is displaced toward the first panel and disengage from the disc at the central hole, releasing the disc.

19. The data disc storage case as claimed in claim 18, wherein the annular surface includes two integral spring levers for lifting the disc upon release of the disc from the hook members.

20. The data disc storage case as claimed in claim 19, wherein each spring lever has a free end bent upwards to form a flange for engagement of the disc at the central hole to position the disc.

* * * * *